No. 861,562. PATENTED JULY 30, 1907.
C. E. WADE.
CLIP OR FASTENER.
APPLICATION FILED DEC. 18, 1906.
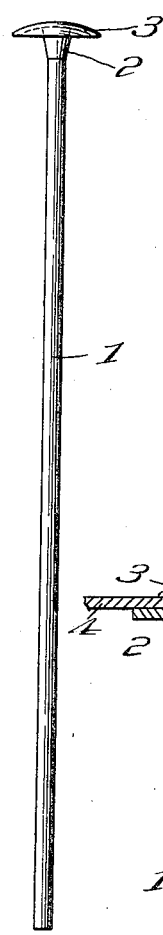
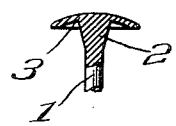
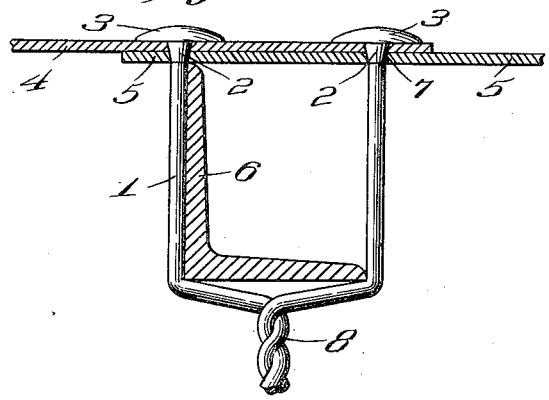
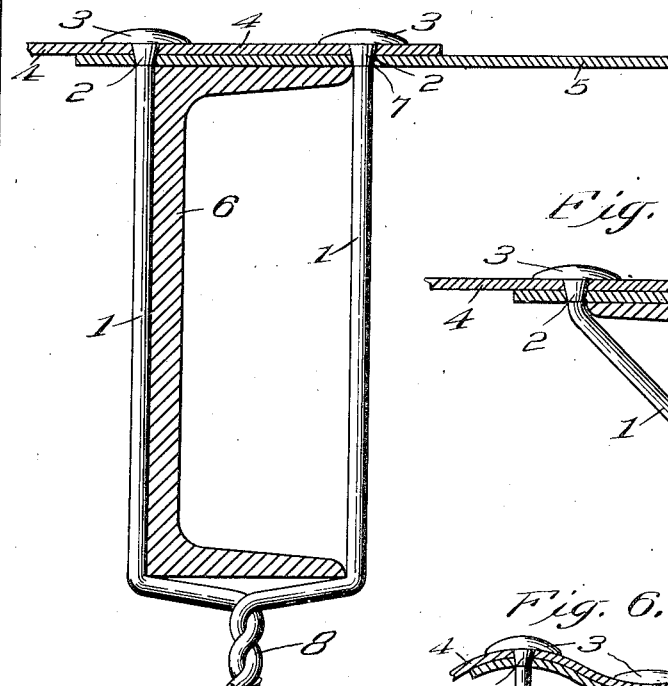
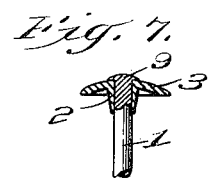
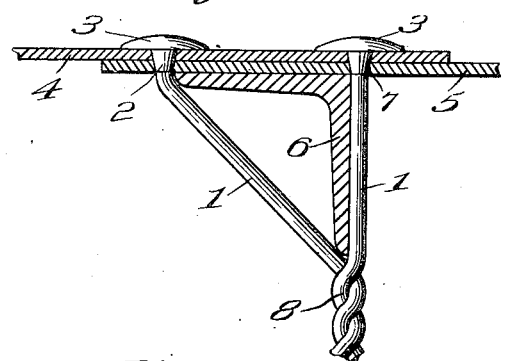
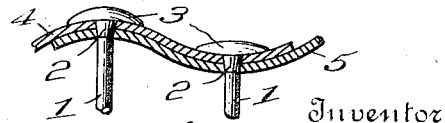
Witnesses
Inventor
Charles E. Wade
By his Attorney
Joseph A. Stetson

UNITED STATES PATENT OFFICE.

CHARLES E. WADE, OF NORTH WALES, PENNSYLVANIA, ASSIGNOR OF ONE-HALF TO WENDELL & MacDUFFIE, OF NEW YORK, N. Y., A FIRM.

CLIP OR FASTENER.

No. 861,562.  Specification of Letters Patent.  Patented July 30, 1907.

Application filed December 18, 1906. Serial No. 348,381.

*To all whom it may concern:*

Be it known that I, CHARLES E. WADE, a citizen of the United States, residing at North Wales, in the county of Montgomery and State of Pennsylvania, have invented certain new and useful Improvements in Clips or Fasteners, of which the following is a specification.

My invention relates to clips or fasteners designed for use in securing parts of a building or other structure together or in position.

The object of my invention is to provide a clip or fastener of simple construction and slight cost, adapted especially to securing in position plates or boards of so-called asbestos or artificial lumber.

My clip or fastener is adapted to provide a secure, tight joint in the overlapping parts and to protect the holes, which must be pierced through the material, so that water or moisture will not enter them.

One of the uses to which my clip is particularly adapted is the securing in position of overlapping boards or plates of artificial or asbestos lumber, similar in character to that described in Letters Patent No. 769,078, issued August 30, 1904, to Ludwig Hatschek.

Figure 1 of the drawings is a side view of my clip or fastener; Fig. 2 is a vertical sectional view through the center of the top or head of my clip; Fig. 3, a partially sectional view, illustrates the use of my clip to secure in position flat, overlapping boards or sheets upon a purlin or other support here illustrated as an angle-iron; Fig. 4 is a similar view, the purlin or support for the overlapping parts being shown as a channel-iron; Fig. 5 is a view similar to Fig. 3, the angle-iron being inverted; Fig. 6 is a view illustrating the application of my clip to overlapping, corrugated sheets; Fig. 7 is a vertical sectional view similar to Fig. 2, illustrating a construction when the head and shank are made of different pieces of metal.

Referring to the drawings, 1 is the shank of my clip, 2 is the wedge-like head thereof, which is surmounted by the cap 3, which is preferably somewhat hollowed at its under surface, as indicated in Fig. 2.

4 and 5 are the overlapping pieces of material which are held in position upon the purlin or other support 6.

The wedge-like head 2 enters holes or apertures 7, which are punched or otherwise formed in the pieces of material 4 and 5 so that when placed in overlapping position the holes will register. When in use the two clips are twisted together at their ends as indicated at 8.

When the material is used on the outside of a building, it is especially desirable to have the overlapping parts held firmly together upon the purlins or framework. My clips are designed to be used in pairs or couples as illustrated. They are driven through the registering holes of the overlapping material well home until the wedge-like head 2 fills tightly its aperture. The cap 3 should be driven well down upon the surface of the material to form an additional protection from moisture. The two clips having been driven into position through the material, the ends are brought together around the purlins or other supports and twisted until the fastening is secure and the clips under strong tension. During the twisting of the ends together, a slight tapping or hammering upon the cap 3 will assist in yielding effective tension and security and seat the head 2 well into the material with the cap 3 also firmly seated.

My clip may be made of a solid piece of suitable material such as annealed iron, soft-drawn copper or aluminium, of such a character that the shanks will resist considerable strain and render themselves readily to being twisted together as indicated. In the form illustrated by Fig. 7, the head 2 and cap 3 may be made of hard metal, while the shank 1 is of softer metal more adapted to twisting, its top being spread to form the retaining head 9.

It will be noticed that, in the use of my clip, its head is held or strained downward through the material exactly perpendicular thereto so that there is no tendency to incline the head to one side and perhaps open a crack through which water might enter the holes.

When my clip is used for securing corrugated sheets, a cap 3 of soft metal is preferably employed so that its rim may be hammered to conform to and fit the undulating or curved surface, as illustrated in Fig. 6, to keep out moisture.

What I claim as new and desire to secure by Letters Patent is:

1. In a clip, a pliable shank, a wedge-like head and a cap upon said head.

2. A fastener composed of two similar parts, each having a wedge-shaped head adapted to be driven into and fill an aperture and a pliable shank, the two shanks being adapted for twisting together to bind a structure in position.

3. In a clip, a pliable shank, a wedge-shaped head, and a cap for the head concave on its under side.

4. In a clip, a pliable shank, a wedge-like head and a soft metal cap upon said head.

Signed at New York city in the county of New York and State of New York this 15th day of December A. D. 1906.

CHARLES E. WADE.

Witnesses:
 JOSEPH A. STETSON,
 MINNIE KAUFFMAN.